July 26, 1966 R. D. BLACK 3,262,665
EXHIBITION FLOWER POT AND STAND
Filed May 3, 1965
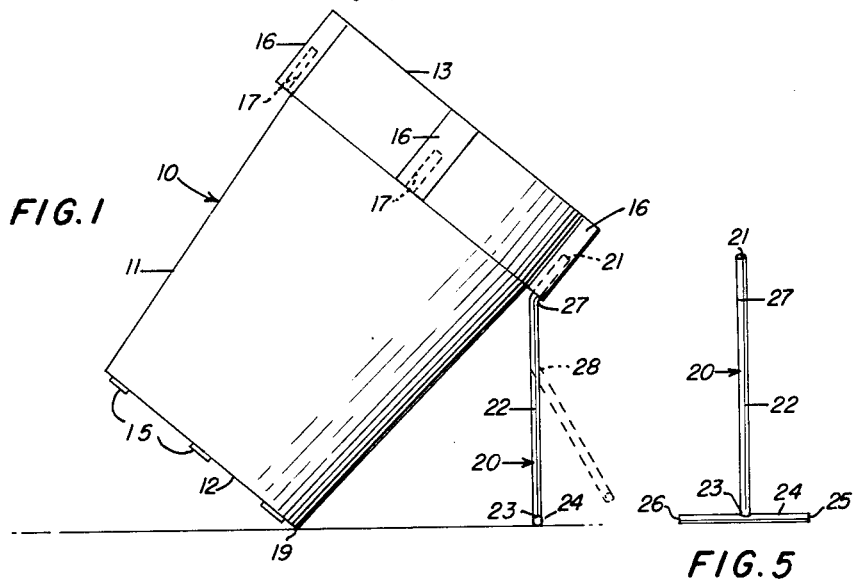
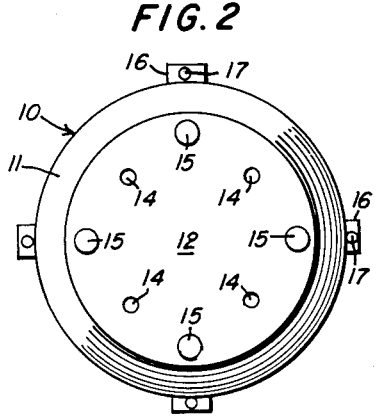
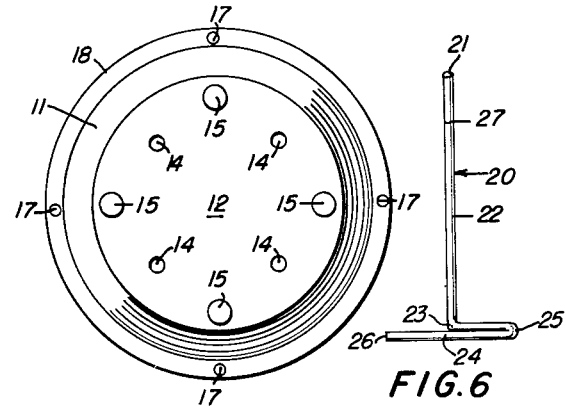
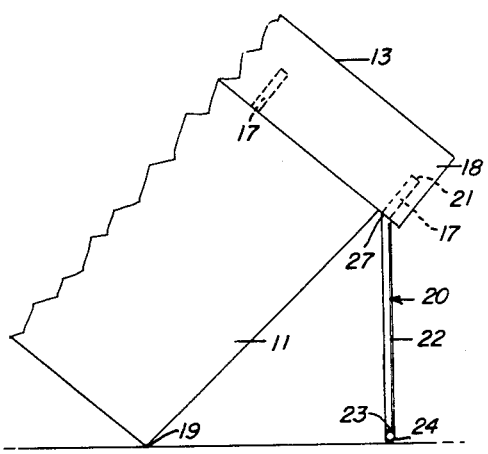
INVENTOR
RICHARD D. BLACK
BY Beale and Jones
ATTORNEYS

3,262,665
EXHIBITION FLOWER POT AND STAND
Richard D. Black, 59 S. Oakland Ave., Sharon, Pa.
Filed May 3, 1965, Ser. No. 452,537
3 Claims. (Cl. 248—153)

This invention relates to the display of flowers and more particularly to a flower pot adapted to display the flowers contained therein at an angle of tilt to enhance their beauty.

The object of this invention is to provide a flower pot that can be supported in a tilted position by a quickly attached supporting device.

Another object of this invention is to provide a supporting device for a flower pot in a tilted position that is inconspicuous in appearance and easily adjustable.

A further object of this invention is to provide a supporting device for a flower pot in a tilted position that is pleasing and simple in design and easily constructed.

Further objects and advantages of the present invention will be apparent from the following description, reference being had to the accompanying drawings, wherein the invention is clearly shown.

In the accompanying drawings:

FIG. 1 is a vertical side elevation view of one embodiment of the flower pot held in a tilted position by the supporting device;

FIG. 2 is a bottom plan view of the flower pot in FIG. 1;

FIG. 3 is a partial vertical side elevation view of another embodiment of the flower pot held in a tilted position by the supporting device;

FIG. 4 is a bottom plan view of the flower pot in FIG. 3;

FIG. 5 is a front elevation view of one embodiment of the supporting device; and FIG. 6 is a front elevation view of another embodiment of the supporting device.

Referring to the drawings by numerals, 10 represents a flower pot in general which may be made of any suitable material such as potters clay, glass or molded plastic and may also be of any suitable size and configuration although preferably it is of inverted frusto-conical form or has upwardly flaring side walls 11 closed at its lower end by the bottom wall 12, the upper or rim end 13 being open for the insertion of objects to be displayed such as flower plants. The bottom wall may have feet 14 for support in an upright position and one or more vent holes 15 for adequate draining and ventilation as is well known for healthy growth of potted plants.

As shown in the embodiment of the flower pot in FIGS. 1 and 2 a plurality of spaced apart bosses or projections 16 are provided on the exterior wall 11 at the rim edge 13 having downwardly opening recesses or sockets 17, closed at the top, for receiving an end 21 of a brace or support device designated generally by the numeral 20.

Another embodiment in FIGS. 3 and 4 has a continuous annular raised portion 18 on the exterior wall 11 at the rim edge 13 in which the downwardly opening sockets or recesses 17, closed at the top, are equally spaced.

The pots here shown are provided with four recesses or sockets 17, that number being considered adequate to provide an appropriate orientation of the pot for effective display of the flowers or plants contained therein. However, it is to be understood that the invention is not limited to that number and a greater or lesser number of sockets can be used if desired.

The brace or support device 20 is constructed in the form of an inverted T of any suitable material, preferably from metal wire of appropriate size and has a main portion 22, one end of which is received in the sockets 17 and the other end 23 attached as by welding to a central point of a base portion 24. Alternatively the brace 20 may be constructed of a single piece of wire bent as shown in FIG. 6, 90 degrees at the lower end of the main portion 23 and back upon itself 180 degrees at one end of the base portion 25 to form the inverted T shape.

In practice the brace 20 may be supplied with a bend at 27 so that the top portion extends at an obtuse angle of 140 to 150 degrees to a plane containing the main portion 22 and the base portion 24 and when inserted in the socket 17 will permit the pot to be tilted over to rest on the base portion 24 with its transversely spaced end points 25 and 26 and a point 19 on the bottom rim of the pot thus providing a stable 3 point support. The length of the main portion 22 and the angle of bend at the point 27 are optimumly chosen for a specific size of flower pot so that when the main portion 22 is essentially vertical the least angle of tilt will be obtained. When a greater angle of tilt is desired the brace may be bent outwardly further at point 27 or at any other point such as 28 shown by dotted lines in FIG. 1.

Although in the preferred form of this invention the brace 20 is detachably received in the sockets 17 it is to be understood that one or more such braces, unbent at point 27 may be fixedly secured in the sockets 17 or at any other point proximate to the rim edge 13 and bent outwardly when it is desired to tilt the pot in a certain direction. Also, it is to be further understood that the brace 20 may be altered in shape and be provided with coverings or attachments for decorative purposes.

Having thus described my invention, what I claim as new and useful is:

1. Bracing means for supporting a flower pot or the like in tilted position in combination with said pot or the like having a rim around its top and a lower edge around its bottom, said brace means comprising a wire member of inverted T-shaped configuration with a vertically disposed main portion having its upper end attached to said pot or the like proximate said rim and having a lower horizontally disposed base portion, said pot or the like having a recess in said rim for receiving the upper end of said brace main portion, and said base portion providing at least two horizontally spaced support points which, together with a point on said lower edge of said pot or the like, provide a stable three-point support for said pot or the like in said tilted position.

2. Apparatus in accordance with claim 1, wherein said rim has spaced projections with downwardly opening recesses therein circumferentially spaced on its exterior surface for receiving the upper end of said brace main portion.

3. Apparatus in accordance with claim 1 wherein said rim has an exterior annular raised portion with spaced downwardly opening recesses for receiving the upper end of said brace main portion.

References Cited by the Examiner

UNITED STATES PATENTS

| 482,978 | 9/1892 | Hunter | 248—455 |
|---|---|---|---|
| 664,922 | 1/1901 | Bening | 248—224 |
| 945,520 | 1/1910 | Greenwood | 248—175 |
| 949,535 | 2/1910 | Hamm | 248—125 |
| 1,831,493 | 11/1931 | Holtzman | 248—351 |
| 2,115,696 | 5/1938 | Ashley | 248—359 X |
| 2,159,932 | 5/1939 | Muldoon | 248—359 |
| 2,492,152 | 12/1949 | Hollowell | 248—146 X |
| 2,778,679 | 1/1957 | Lear | 293—77 |

FOREIGN PATENTS 217,498  6/1924  Great Britain.

CLAUDE A. LE ROY, *Primary Examiner.*